July 21, 1942.  A. W. SMITH  2,290,297
TARGET PRACTICE DEVICE
Filed March 6, 1939  4 Sheets-Sheet 1
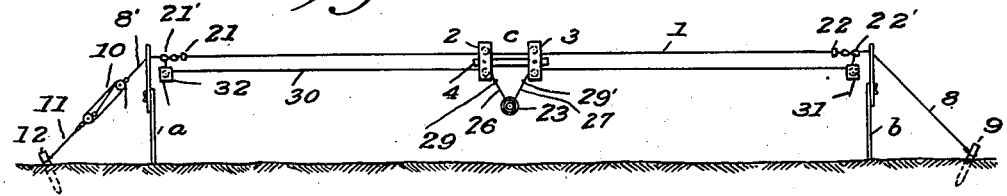
Fig. 1.
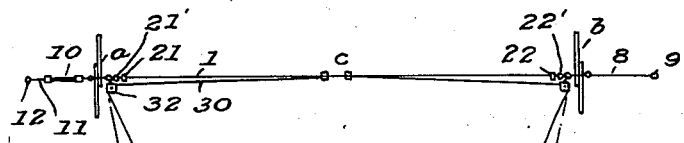
Fig. 2.
Fig. 3.
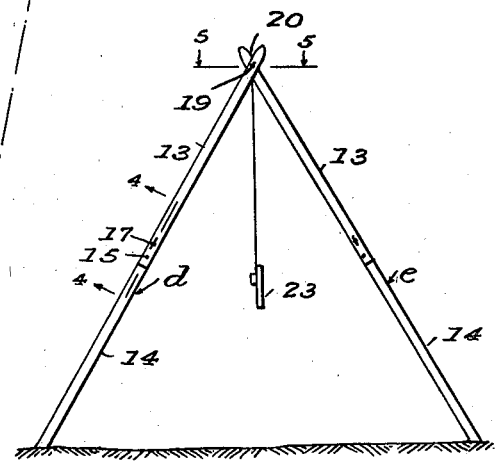
Fig. 4.
Fig. 5.
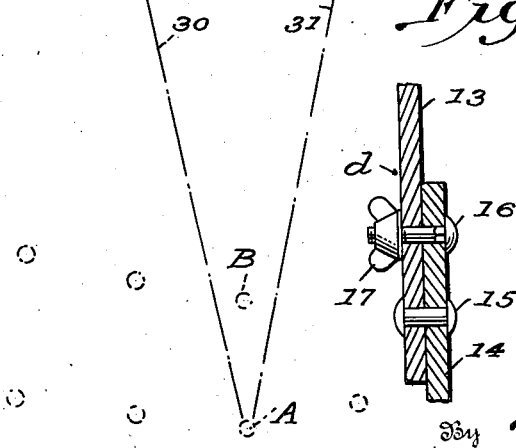
Inventor
ALVIN W. SMITH.
By Milans & Milans
Attorneys July 21, 1942.  A. W. SMITH  2,290,297
TARGET PRACTICE DEVICE
Filed March 6, 1939  4 Sheets-Sheet 2
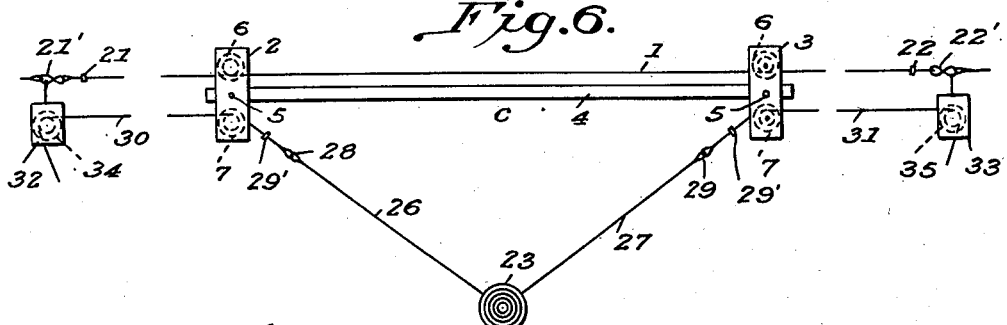
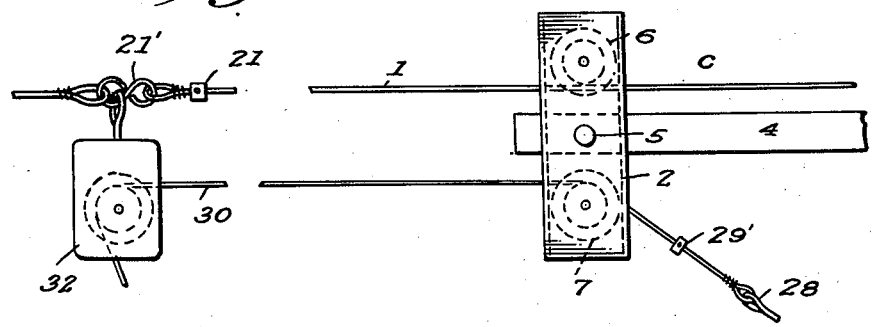
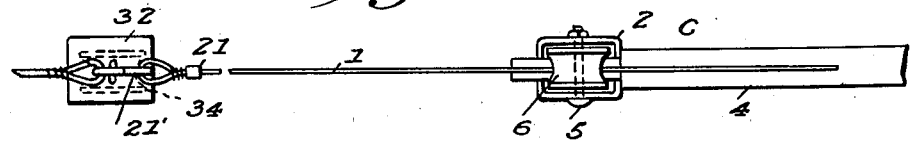
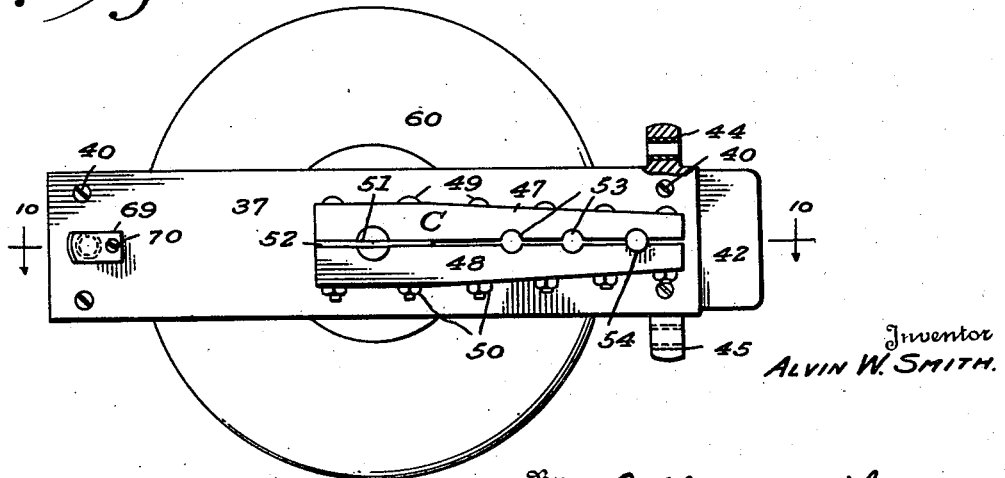
Inventor
ALVIN W. SMITH.
By Milans & Milans
Attorneys

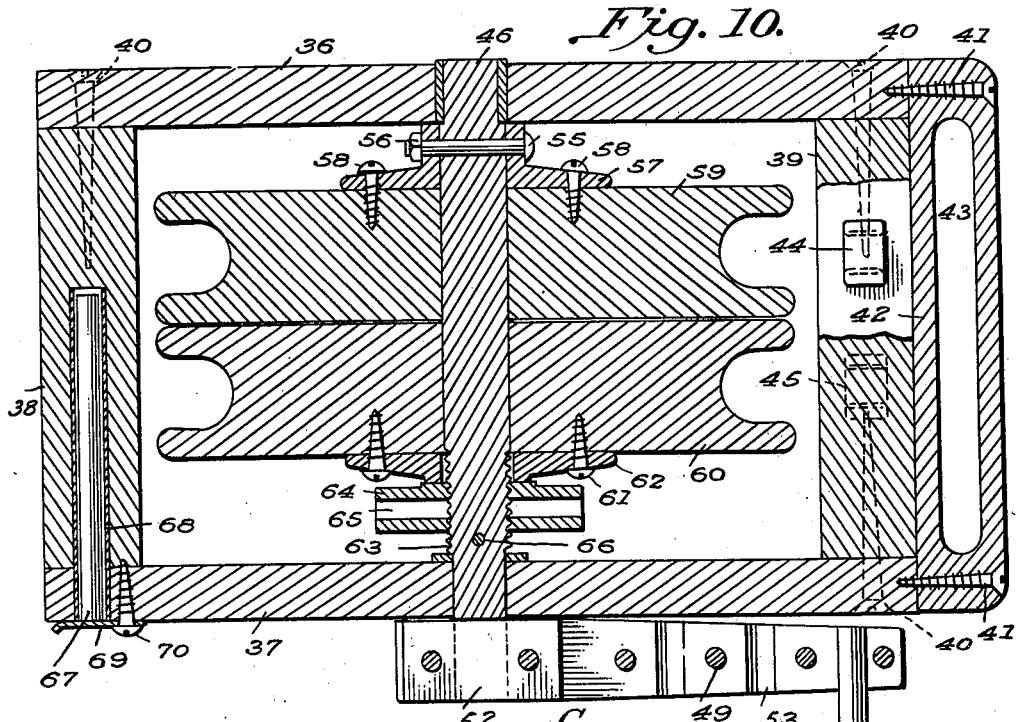

July 21, 1942.  A. W. SMITH  2,290,297
TARGET PRACTICE DEVICE
Filed March 6, 1939  4 Sheets-Sheet 4
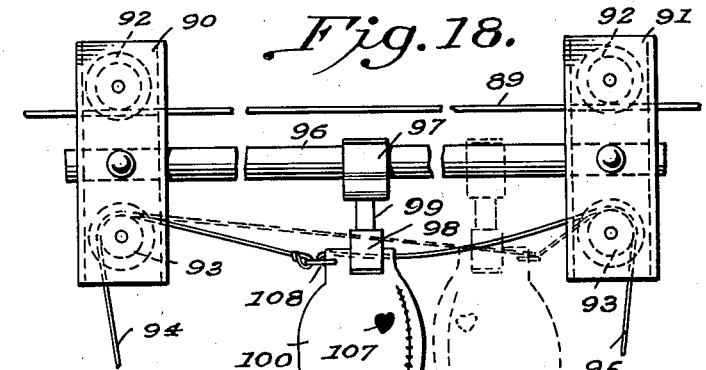
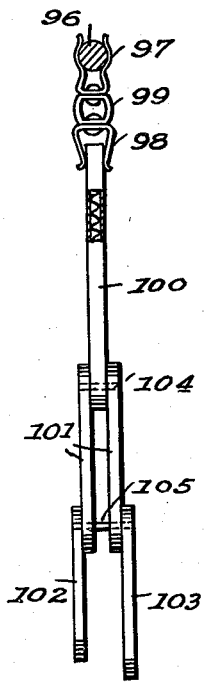
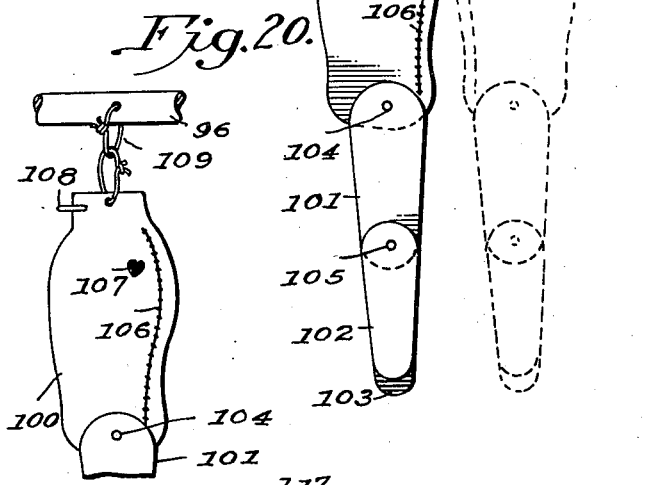
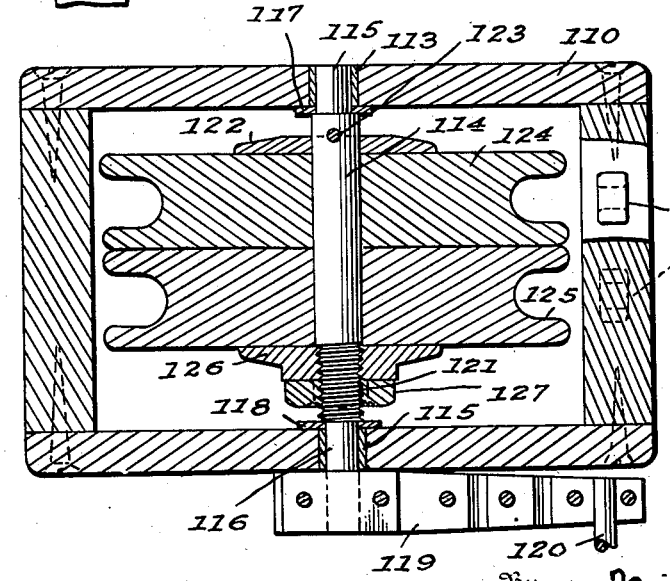
Inventor
ALVIN W. SMITH
By Milans & Milans
Attorneys Patented July 21, 1942

2,290,297

UNITED STATES PATENT OFFICE 2,290,297

TARGET PRACTICE DEVICE

Alvin W. Smith, Cincinnati, Ohio

Application March 6, 1939, Serial No. 260,190

7 Claims. (Cl. 273—105.2)

My invention relates to new and useful improvements in a target practice device and more particularly to a device of this character for shooting at moving objects or targets with revolvers, automatic pistols, sub-machine guns, or the like, the device being of particular advantage for teaching law enforcement officers accurate shooting. The entire device may be either of portable form or fixed in position as may be desired.

The principal object of the invention resides in the provision of a device of the character described in which the target may be moved longitudinally in either direction or raised and lowered into different vertical positions, the operating mechanism being such that the longitudinal movement may be given to the target independent of any vertical adjustment thereof, vertical adjustment of the target may be obtained without longitudinal adjustment, or both longitudinal and vertical adjustment of the target may be obtained simultaneously.

Another object of the invention consists in the provision of a novel form of operating device, or what may be termed a "motivator," which may be readily carried by the operator, this so-called "motivator" including a pair of pulleys or channeled members on which operating cables may be wound or unwound, in practice one of the cables being wound on its associated pulley while the other is unwound, but the pulleys or channel members being so mounted and arranged that they may be operated to wind both of the cables thereon when not to be used, it being understood that likewise the two cables may be simultaneously unwound when getting ready for use.

A further object of the invention resides in providing the so-called "motivator" with guide members for properly positioning the cables and directing the same onto or from the pulleys or channel members, means also being provided for obtaining frictional engagement of adjacent surfaces of the pulleys or channel members or releasing said frictional engagement as desired.

Still another object of the invention consists in the novel form of targets which may be readily attached to or detached from the operating cables, in one instance the target being of a shape to denote the human body, this target being formed in sections pivotally connected so that the effect of a stumbling man may be created, means being provided, adjacent the target, to engage the same to create this so-called stumbling movement as the target is moved longitudinally with respect to the main supporting member.

A further object of the invention resides in the provision of means whereby the target of the form of the human body may be properly positioned according to the direction of travel, or in other words, the front of the body facing the direction of travel, means also being provided to turn the body when the direction of travel is reversed.

A still further object resides in the provision of a device of the character described which may be operated from different positions of the operator relative to the target this permitting the shooter to stand at different distances away from the target when shooting or at different angles relative thereto.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 shows a front elevation.

Fig. 2 shows an end elevation.

Fig. 3 is a top plan, parts being shown diagrammatically.

Fig. 4 is a fragmental sectional detail on the line 4—4 of Fig. 2 looking in the direction of the arrows.

Fig. 5 is a fragmental sectional detail on the line 5—5 of Fig. 2 looking in the direction of the arrows.

Fig. 6 is a fragmental front elevation, parts being broken away, showing the supporting cable and carriage with associated parts for carrying and operating the target.

Fig. 7 is a fragmental enlarged front elevation of an end portion of the construction shown in Fig. 6.

Fig. 8 is a top plan of the construction shown in Fig. 7.

Fig. 9 is a side elevation of the operating member or so-called "motivator," parts being shown in section.

Fig. 10 is a horizontal section on the line 10—10 of Fig. 9 looking in the direction of the arrows, with parts shown in plan.

Fig. 11 is a side elevation or edge view of one form of target.

Fig. 12 is a face view of that form of target illustrated in Fig. 11.

Fig. 13 is an end view, partly in vertical section, of a modified form of target and supporting means therefor.

Fig. 14 is a side elevation of the form of target shown in Fig. 13 with parts shown in vertical section.

Fig. 15 is a vertical section through a still further modified form of target with a fragment of the supporting means therefor shown in side elevation.

Fig. 16 is a front elevation, similar to Fig. 1 of the drawings, showing a modified form of target, in the form of a human body, and means adapted to engage and operate the same to simulate a stumbling person.

Fig. 17 is a fragmental edge view of the form of target shown in Fig. 16.

Fig. 18 is a fragmental front elevation of a modified form of target in the form of a human body and means for supporting and operating the same.

Fig. 19 is an edge view of the form of target shown in Fig. 18 with parts broken away.

Fig. 20 is a fragmental front elevation showing a slightly modified form of supporting means for the target shown in Figs. 18 and 19; and Fig. 21 is a horizontal section through a slightly modified form of "motivator" with parts shown in plan.

In carrying out my invention I provide the standards which I have indicated generally at $a$ and $b$ which are supported from the ground or other surface, as indicated more particularly in Figs. 1 and 2 of the drawings, to support a cable 1 which forms a track for the carriage which is indicated generally at $c$ the carriage including the hangers 2 and 3 which are connected in longitudinally spaced relation by the rod 4, the ends of the rods passing through the hangers as quite clearly illustrated in Figs. 1, 6, 7 and 8 of the drawings and held against displacement by the screws 5 or other suitable fastenings. Each of the hangers 2 and 3 has mounted, adjacent its upper end, a pulley 6, these pulleys adapted to run on the cable 1 as will be appreciated, the carriage as a whole being adapted for longitudinal movement relative to the cable 1 in a manner which will be later described. Mounted adjacent the lower end of each of the hangers 2 and 3 is a pulley 7 for the purpose which will be presently brought out. An extension from one end of the cable 1 extends downwardly as shown more particularly at 8 and is attached to a stake 9 which is driven into the ground. The opposite end of the cable 1 is shown as connected, by means of an extension, to a block and tackle indicated at 10 and which block and tackle is in turn connected to a wire 11 which is connected to the stake 12 driven into the ground. While I have shown the use of a block and tackle at only one end it will be understood that, if desired, blocks and tackle might equally as well be used at both ends or when desired the blocks and tackle may be done away with and the connection made to the ground as shown at the right of Fig. 1 of the drawings.

Each of the standards $a$ and $b$ is formed with the legs $d$ and $e$, each leg including the two sections 13 and 14 pivotally connected at 15 and normally held against swinging movement by the bolt 16 and wing nut 17. The upper ends of the sections 13 are pivotally connected by the bolt 18, which carries the wing nut 19 or by means of a rivet. Normally the legs of the standards will be swung apart, as shown quite clearly in Fig. 2 of the drawings, and at the top provide the V-shaped recess 20 through which cables connected to the cable 1 extend. It will be understood, when desired, the standards may be collapsed and by loosening the wing nut 19 the legs $d$ and $e$ may be swung to extend parallel and by loosening and removing the wing nut 17 the bolt 16 may be removed so that the sections 13 and 14 of each leg may be swung to extend parallel. It will thus be seen that the standards may be collapsed into compact form for storage purposes.

Carried by or formed as a part of the cable 1 are the longitudinally spaced stops 21 and 22 which limit the longitudinal movement of the carriage $c$ relative to the cable 1. Connected to opposite ends of the cable 1 are the S-hooks 21' and 22', the extension cable 8 being connected to the hook 22' while an extension cable 8' is connected to the hook 21' and to the block and tackle 10. A target is shown at 23, this target being in the form of a disc having the slots 24 and 25 formed in a projection from the rear face. Cables or wires 26 and 27 are connected to the target by having their lower ends extending through the slots 24 and 25, it being understood that the ends of the cables 26 and 27 may be knotted. The opposite or upper ends of the wires or cables 26 and 27 are respectively connected at 28 and 29 to the wires or cables 30 and 31, the wire or cable 30 passing over the pulley 7 of the hanger 2, while the wire or cable 31 passes over the pulley 7 of the hanger 3, as is quite clearly illustrated in the drawings. Supported and suspended from eyes of the S-hooks 21' and 22' respectively are the blocks 32 and 33, the block 32 having mounted therein a pulley 34, while the block 33 has mounted therein a pulley 35. The cable or wire 30 passes over the pulley 32, while the wire or cable 31 passes over the pulley 35. The opposite ends of these wires or cables 30 and 31 respectively are adapted to be wound on pulleys or channel members carried by an operating device or "motivator" which will be later described, this operating device or "motivator" being indicated generally at A in Fig. 3 of the drawings. The "motivator" or operating device will be carried by a person who will operate the target and in full lines in Fig. 3 of the drawings I have shown the operating device or "motivator" positioned for a shooter firing from a twenty yard line, the shooter being shown in full lines in Fig. 3 of the drawings at B. In this same figure I have diagrammatically shown, by dotted lines, the position of the operating device or "motivator" with the shooter firing from the fifty yard line. At opposite sides of the indications A and B I have shown circles indicating how the operator and shooter may move to the side to assume position at different angles with respect to the target. Connected to each of the wires or cables 30 and 31, and positioned as shown more particularly in Figs. 6, 7 and 8 of the drawings, is a stop 29' the purpose of which will be later brought out.

The so-called "motivator" or operating device is shown more particularly in Figs. 9 and 10 of the drawings and is adapted to be carried by the person who is to operate the target. This "motivator" or operating device is in the form of a frame including the side portions 36 and 37 and end portions 38 and 39, the side portions being connected to the end portions by means of the screws 40 or other suitable fastenings. Secured to the side portions 36 and 37, adjacent the end portion 39, by means of the screws 41 or other suitable fastenings, is a member 42 having the elongated opening 43 and this member may be used as a hand-hold while the opposite end 38 of the frame may be placed against the person and thus support the frame in operating position. Formed on or secured to the upper surface of the end portion 39 is a guide member 44, while formed on or secured to the under surface of the member 39 is a guide member 45. Rotatably supported by the side portions 36 and 37 is a shaft 46 having one end projecting beyond the side portion 37 to receive the arm indicated generally at C. This arm C is formed of the sections 47 and 48 which are adapted to be secured together by means of the bolts 49 and nuts 50. Adjacent one end the sections 47 and 48 are formed in their inner surfaces with semi-circular recesses adapted to receive the projecting end of the shaft 46, the projecting end of the shaft being formed with a slot 51 in which is positioned a plate 52 which is elongated as shown more particularly in Fig. 10 of the drawings, this plate being received between the inner faces of the sections 47 and 48 of the arm and held in position by means of the bolts 49 and nuts 50 on opposite sides of the projecting end of the shaft as is quite clearly illustrated in the drawings. The inner faces of the sections 47 and 48 are further provided with semi-circular recesses 53 which when the sections are together form circular openings to receive the end of a rod 54 forming a hand-hold or grip for operating the arm to in turn rotate the shaft 46. The rod, hand-hold or grip 54 may be placed in any one of the circular openings formed by the recesses 53 in the inner faces of the sections 47 and 48 of the arm C thus regulating the throw of the arm in operating the shaft.

Secured to the shaft 46, adjacent the side portion 36 of the frame, by the bolt 55 and nut 56, is a collar 57 which has secured thereto, by means of the screws 58 or other suitable fastenings, a pulley 59 which is preferably formed of wood. It will be noted that the pulley 59 is held against longitudinal movement on the shaft 46. A pulley 60 of the same formation as the pulley 59 is slidably mounted on the shaft 46 and has secured thereto, by means of the screws 61 or other suitable fastenings, a collar 62, this collar 62 being formed with a central bore of greater diameter than the shaft 46 to permit the sliding movement of the pulley 60 above described. A portion of the shaft 46, adjacent the side portion 37 of the frame, is threaded as shown at 63 and receives the nut 64 having a plurality of circumferentially spaced openings 65 therein. This nut is normally adapted to be adjusted to engage the outer face of the collar 62 and to force the inner face of the pulley 60 into tight frictional engagement with the inner face of the pulley 59 so that when the shaft 46 is rotated the pulleys will be rotated in unison. A pin 66 extends transversely through the shaft, adjacent the outer face of the nut 64 to limit the loosening movement of this nut.

In order that the nut 64 may be properly tightened or loosened I provide the rod 67, one end of which is adapted to be placed in one of the openings 65 of the nut while the opposite end projects for use as a hand-hold. This rod 67 is normally received in a chamber 68 in the end portion 38 of the frame, the end of the chamber projecting through the side portion 37 of the frame as is quite clearly illustrated in Fig. 10 of the drawings. The chamber is closed by the plate 69, secured to the side portion 37 of the frame, by means of the screw 70 or other suitable fastening, it being understood that the plate may be rotated to open the end of the chamber to permit the rod 67 to be removed or replaced and when the rod is in position within the chamber the plate will be rotated to close the end thereof.

In Figs. 13 and 14 of the drawings I have shown a slightly different form of target to be supported by the wires or cables 26 and 27. This form of target includes a tubing 71 slotted as shown at 72. Received on the end of this tubing is a plate 73 having its inner face recessed to receive the end of the tubing as is shown quite clearly in Fig. 14 of the drawings. The tubing is provided with the openings 74 through which the ends of the wires or cables 26 and 27 project, it being understood that the ends of these wires or cables will be knotted interiorly of the tubing to prevent the ends from being withdrawn through the openings 74.

In Fig. 15 of the drawings I have shown a still further modified form of target. This target includes a plate 75, recessed in one face, to provide the peripheral flange 76. This form of target is also adapted to be suspended from the wires or cables 26 and 27 and when this form of target is in use a hook 77 will be connected to the end of each of the wires or cables 26 and 27 to be engaged under the flange 76 as is quite clearly illustrated in Fig. 15.

In Fig. 16 of the drawings I have illustrated what might be termed a modified form of the invention in which the target is formed to simulate the figure of a man and means are provided for operating the target, as the same is moved longitudinally relative to the supporting member to indicate a stumbling action or to so move the target as to illustrate a man stumbling after he might have been shot by a law enforcement officer. In general respects this modified form of the invention is similar to the preferred form. In this modified form of the invention, disclosed in Fig. 16 of the drawings, standards are indicated at 78 similar to the standards disclosed in Figs. 1 and 2 of the drawings and these standards support the cable or track 79, corresponding to the cable or track 1. Operable on this cable or track 79 is the carriage 80, similar to the carriage c, the carriage being adapted for longitudinal movement on the cable or track 79 through operation of the wires or cables 81 and 82 corresponding to the wires or cables 30 and 31. The target is adapted to be suspended by these wires or cables 81 and 82 and is formed of the sections 83, 84 and 85, the section 84 being pivotally connected to the section 83 at 86 while the section 85 is pivotally connected to the section 84 at 87. The sections are formed to simulate the body of a man. The section 83 is formed of one part while the sections 84 and 85 are each formed of two parts as shown more particularly in Fig. 17 of the drawings, the parts of each section being parallel and one part of the section 85 being slightly longer than the other part as shown in Fig. 16. The sections 83, 84 and 85 are made of corrugated board or similar material. Positioned on the ground, or other surface, are a plurality of longitudinally spaced projections or obstructions 88 and these projections or obstructions are adapted to engage, at desired times the parts of the section 85 of the target so as to swing the sections as the target is moved longitudinally to simulate the stumbling action of a man. The longer part of this section 85 will drag longer than the shorter part in going over the projections or obstructions 88. It will be understood that in target practice, particularly where law enforcement officers are doing the shooting, it is desired that the target be moved and positioned as would be the case of a man running away from the enforcement officer in actual practice.

From the above detailed description it is thought that the construction shown in Figs. 1 to 17 inclusive will be clearly understood and I will now endeavor to further bring out the manner of operation. It can be appreciated that in target practice it is desirable to move the target into different positions to make it more difficult for the shooter to hit the same this tending to improve the aim of the shooter which is quite desirable. In my improved form of device the target is adapted to be operated by an operator positioned in back of the shooter and means are provided for not only moving the target longitudinally relative to its supporting track but also to raise or lower the same to different vertical positions. The operating mechanism is so formed that longitudinal movement may be given to the target independently of any vertical movement, vertical movement may be given independently of any horizontal movement, or the longitudinal movement and vertical movement may be given simultaneously. The operator carries a device which I have termed a "motivator" which includes two pulleys and the operating wires or cables are so wound upon the pulleys that when the pulleys are operated in unison one wire or cable will be wound thereon while the other will be unwound. Due to this movement the target may be moved longitudinally on its supporting track or cable. Vertical movement is given to the target by the operator carrying the "motivator" moving forwardly or rearwardly with respect to the target. The wires or cables 30 and 31 are the ones which are connected to the pulleys of the so-called "motivator." The wire or cable 30 will be passed through the guide 44 and over the pulley 51. The wire or cable 31 will pass through the guide 45 and under the pulley 60. These wires or cables will be connected to their respective pulleys in any desired manner and when the device is to be used the nut 64 will be forced into tight engagement with the collar 62 to thereby force the inner face of the pulley 60 into tight frictional engagement with the inner face of the pulley 59. Then when the operator grasps the hand-hold 54 and rotates the shaft 46 the wire or cable connected to one of the pulleys will be wound thereon while the wire or cable will be unwound from the other pulley depending upon the direction of rotation. Preferably in use the "motivator" will be held so that the end portion 38 will bear against the operator whose hand is engaged in the opening 43 of the member 42. This forms a convenient manner of holding although, of course, it will be understood that the operator may use other methods as he may find desirable in use.

Assuming that the shooter is in the full line position B, shown in Fig. 3 of the drawings, or what might be termed a twenty yard line. The operator of the "motivator" will be in the position shown by full lines at A behind the shooter. If the shaft 46, of the "motivator," is rotated to wind the wire or cable 31 on its associated pulley, while unwinding the wire or cable 30 from its associated pulley, the stop 29' to the right in Figs. 1 and 6 of the drawings will engage the hanger 3 and thereby move the carriage c to the right of these Figs. 1 and 6 and carry the target 23 therewith. If the shaft 46 of the "motivator" is rotated in the opposite direction the stop 29' to the left of the Figs. 1 and 6 will engage the hanger 2 and move the carriage c and target 23 in the opposite direction from that previously described. It will thus be seen that on rotation of the shaft 46 of the "motivator" in the desired direction the carriage with the target may be moved in the desired direction longitudinally on the cable or track 1. If it is desired to move the target 23 vertically the operator of the "motivator" moves forwardly or rearwardly with respect to the shooter and the supporting member for the target. If he moves forwardly the cables or wires 30 and 31 will both move inwardly towards the center of the carriage c thereby permitting the cables or wires 26 and 27 to lower due to the weight of the target. If the operator of the "motivator" moves rearwardly the operation is reversed and the target will be raised. Of course, the target cannot be raised any further than a determined position due to the fact that the stops 29' will engage their respective hangers 2 and 3. The operator and shooter may also move to either side, as indicated, to be at different angular positions with respect to the target. With respect to Fig. 16 of the drawings it can be seen that when the target is lowered so that the parts of the lower section 85 are in position to be engaged by the projections or obstructions 88, when the carriage 80 is moved longitudinally on the cable or track 79, the sections of the target will be swung to simulate, as previously described, the stumbling action of a man running, one part of the section 85 being longer than the other drags a longer time over the projections or obstructions. When the shooting is completed and it is desired to store the "motivator" and other parts, both of the cables or wires 30 and 31 may be wound upon their respective pulleys by releasing the frictional engagement between the pulleys. When this is done the pulleys may be separately rotated in the desired directions to wind the wires or cables thereon. This friction is released by loosening the nut 64. As has been previously described the nut may be operated by placing the rod 67 in one of the holes 65 of the nut.

In Figs. 18 and 19 of the drawings I have illustrated a still further modified form of target formed and adapted to simulate a human being, this particular form being along the lines of the form illustrated in Figs. 16 and 17 of the drawings, but adapted to be turned to face the direction of travel of the carriage which is supported on the cable or track. In this particular form or modification of the invention, a cable or track is shown at 89 and supports the carriage which includes the hangers 90 and 91, each of the carriages having mounted therein a roller 92 which operates over the cable or track 89 and the rollers 93 over which operate the wires or cables 94 and 95 which in turn lead to and are operated by the "motivator," not illustrated. The hangers 90 and 91 are connected by the spacer rod 96 from which the target is suspended through means of the spring clamps 97 and 98 connected by the swivel 99. The spring clamp 97 will engage the spacer rod 96 whereas the spring clamp 98 will engage the neck portion of the body 100 of the target, this body being formed preferably of corrugated board or similar material. The thigh portions of the legs depending from the body 100 are shown at 101 whereas the calf portions are shown at 102 and 103, the thigh portions 101 being pivotally connected to the body by means of the pivot pin 104, whereas the calf portions are pivotally connected to the thigh portions by the pin 105. It will be noted that the calf portion 102 is somewhat shorter than the calf portion 103. There is advantage in this in that as the target is operated longitudinally of the supporting track or cable 89, the ends of the calf portions 102 and 103 will engage the projections 88 shown in Fig. 16 of the drawings and the calf portion 103 will drag and not be released from the projection until after the calf portion 102 has been released. This gives quite a human-like appearance to the target, of a running man. In Fig. 18 of the drawings I have designated the spinal column of the body at 106 and the heart at 107. A ring 108 is connected to the body 100, adjacent the upper end thereof, and connected to this ring 108 are the ends of the wires or cables 94 and 95.

The target, as shown by full lines in Fig. 18 of the drawings, is facing for the carriage to be drawn to the left of the figure by means of the cable or wire 94. When it is desired to move the target towards the right of this figure the cable or wire 95 will be pulled and this will swing the target on the swivel 99 and cause the same to assume the position shown in dotted lines in Fig. 18. From the above it will be seen that not only may this form of target be drawn in either direction longitudinally of the supporting cable or track but the position of the same may be reversed so that the target may be positioned as would the human body in the case of a man running and the shooter may fire to hit the spine or the heart.

In Fig. 20 I have shown a little different manner of supporting the target which is illustrated in Figs. 18 and 19. In this particular form of the invention the target is suspended from the spacer rod or bar 96 by the loops 109. In all other respects the construction shown in this figure is the same as that shown in Figs. 18 and 19.

In Fig. 21 of the drawings I have shown a "motivator" of a slightly different construction than that disclosed in Figs. 9 and 10. In the form of the device illustrated in Fig. 21 I provide the rectangular frame 110 on one end portion of which I provide the guide members 111 and 112 the same as are provided in the form shown in Figs. 9 and 10, one of these guide members being on one face of the end portion while the other guide member is on the opposite face thereof. It will be noted that in the form shown in Fig. 21 I do not provide the hand grip such as is shown at 42 in Figs. 9 and 10 of the drawings. Supported in the bearings 113, in the side bars of the frame, is a shaft 114 having its ends reduced as shown at 115 and 116 to form shoulders to engage the washer plates 117 and 118. The reduced extension 116 projects beyond the outer face of the frame to receive the arm 119 having the handhold or grip 120. The shaft 114 is threaded at 121. A bearing plate 122 is positioned on the shaft 114 and held against movement towards its adjacent end of the shaft by means of the pin 123 which passes through the shaft and is received in notches formed in the outer face of the plate. Pulleys mounted on the shaft are shown at 124 and 125, the outer face of the pulley 124 engaging the bearing plate 122 while the inner faces of the pulleys are normally held in frictional engagement by forcing the bearing plate 126 inwardly by the nut 127 received on the threaded portion 121 of the shaft. This form of "motivator" will be used in the same manner as that disclosed in Figs. 9 and 10 of the drawings and is of a somewhat simpler construction than that shown in Figs. 9 and 10. Frictional engagement between the pulleys may be released by loosening the nut 127.

I have shown in the drawings several different forms of targets and it will be appreciated that I do not desire to limit myself to the use of any particular form. However, I wish to lay particular stress on what I consider to be the most important feature of my invention and that is the means for operating the target either longitudinally or vertically with respect to the supporting cable or track as also the fact that in the so-called "motivator" or operating member one operating cable or wire is wound upon its associated pulley while the other wire or cable is unwound from its associated pulley or cable. The longitudinal movement of the carriage on the support 1 will be limited by the stops 21 and 22.

Having fully described my invention what I claim as new and desire to secure by Letters Patent is:

1. A target practice device including a support, a carriage mounted on the support, a target in the form of a human being including body and leg portions, one leg portion being longer than the other, means for operating the carriage longitudinally of the support, and means engageable by the leg portions of the target during the longitudinal movement of the carriage to impart to the target the characteristics of a running man.

2. A target practice device including a support, a carriage mounted on the support and adapted for longitudinal movement thereon, cables engageable with and operable relative to the carriage, a target suspended from the cables, and a portable windlass adapted to be carried by an operator for operating the cables and in turn the carriage on the support, said windlass including a frame, a rotatable shaft mounted in the frame, and pulleys mounted on the shaft for receiving the cables, one of said pulleys being connected to the shaft while the other pulley is normally held in frictional engagement with the first-mentioned pulley to operate therewith.

3. A target practice device including a support, a carriage mounted on the support and adapted for longitudinal movement thereon, cables engageable with and operable relative to the carriage, a target suspended from the cables, and a portable windlass adapted to be carried by an operator for operating the cables and in turn the carriage on the support, said windlass including a frame, a rotatable shaft mounted in the frame, a pair of pulleys on which the cables are adapted to be wound or unwound, means for connecting one of the pulleys to the shaft, and means for frictionally engaging the other pulley with the first-mentioned pulley to operate therewith or to be released therefrom for independent operation.

4. A target practice device including a support, a carriage mounted on the support and adapted for longitudinal movement thereon, cables engageable with and operable relative to the carriage, a target, said target being connected to the cables, and a portable windlass adapted to be carried by an operator for operating the cables and in turn the carriage on the support, said windlass including a frame, a rotatable shaft, and pulleys mounted on the shaft for receiving the cables, one of said pulleys being held on the shaft against longitudinal movement relative thereto while the other pulley is adapted for longitudinal movement on the shaft and normally held in frictional engagement with the first-mentioned pulley to operate therewith.

5. A target practice device including a support, a carriage mounted on the support and adapted for longitudinal movement thereon, a target in the form of a human body suspended from the carriage, members engageable with the carriage and connected to the target at a point removed from the point of suspension and means for operating the members in opposite directions for moving the carriage on the support and moving the target relative to the carriage to a position to face in the direction of movement of the carriage on the support.

6. A target practice device including a support, a carriage mounted on the support and adapted for longitudinal movement thereon, a target in the form of a human body including means for suspending the same from the carriage, members engageable with the carriage and connected to the target, and means for operating the members in opposite directions to move the carriage longitudinally on the support in opposite directions and to in turn move the target relative to the carriage to a position to face in the direction of the movement of the carriage on the support.

7. A target practice device including an elongated support, a carriage mounted on the support and adapted for longitudinal movement thereon, cables engageable with and operable relative to the carriage, a target suspended from the cables, and a portable windlass adapted to be carried by an operator and operable to wind the cables from which the target is suspended on the windlass for imparting longitudinal movement to the carriage and target on the support and moved bodily towards or away from the support for imparting movement to the target relative to the carriage and support.

ALVIN W. SMITH.